(12) United States Patent
Levera et al.

(10) Patent No.: US 7,326,040 B2
(45) Date of Patent: Feb. 5, 2008

(54) PROCESS AND PLANT FOR CONTINUOUS MANUFACTURE OF A FOAM LAYER

(75) Inventors: Guido Levera, Cantu (IT); Pasquale De Michele, Novi Ligure (IT)

(73) Assignee: Sapsa Bedding S.R.L., Assago (MI) (IT)

( * ) Notice: Subject to any disclaimer, the term of this patent is extended or adjusted under 35 U.S.C. 154(b) by 102 days.

(21) Appl. No.: 11/284,914

(22) Filed: Nov. 23, 2005

(65) Prior Publication Data

US 2006/0073229 A1    Apr. 6, 2006

Related U.S. Application Data

(62) Division of application No. 10/299,897, filed on Nov. 20, 2002, now Pat. No. 6,998,077.

(30) Foreign Application Priority Data

May 9, 2002    (IT) .......................... MI2002A0972

(51) Int. Cl.
*B29C 44/58*    (2006.01)
(52) U.S. Cl. ...................... 425/4 C; 425/223; 425/385; 425/817 C
(58) Field of Classification Search .................. 425/4 C, 425/223, 385, 817 C
See application file for complete search history.

(56) References Cited

U.S. PATENT DOCUMENTS 5,229,138 A    7/1993   Carotti
6,086,802 A    7/2000   Levera et al.
6,312,244 B1   11/2001  Levera et al.
6,901,851 B2   6/2005   Baumann

FOREIGN PATENT DOCUMENTS

DE    101 48 698    * 10/2001
EP    0380963       8/1990

OTHER PUBLICATIONS

EPO Office Action dated Jun. 29, 2004 issued for European Application No. 02 025 766.3.
EPO Office Action dated Feb. 25, 2005 issued for European Application No. 02 025 766.3.

* cited by examiner

*Primary Examiner*—Allan R. Kuhns
(74) *Attorney, Agent, or Firm*—Stevens, Davis, Miller & Mosher, LLP

(57) ABSTRACT

Plant for manufacturing latex foam layer of unlimited length and having lower and upper recesses. A plurality of laying planes provided with lower protuberances proceeds between an injection station and a layer removing station. Foam provided with lower recesses is directed towards a vulcanizer between the injecting station and the removing station. A plurality of upper plates, each provided with protuberances, is lowered, one by one, on the foam layer to impress upper recesses before the foam layer enters the vulcanizer. The plates, placed on the foam layer, have their ends shaped to avoid any penetration of steam condensation drops. Upper plates release their weight to fixed supports of the planes to which they are bound until they leave the vulcanizer. The return of the plates from the extraction station towards the new cycle of moulding is independent of the operating system of the planes.

17 Claims, 6 Drawing Sheets

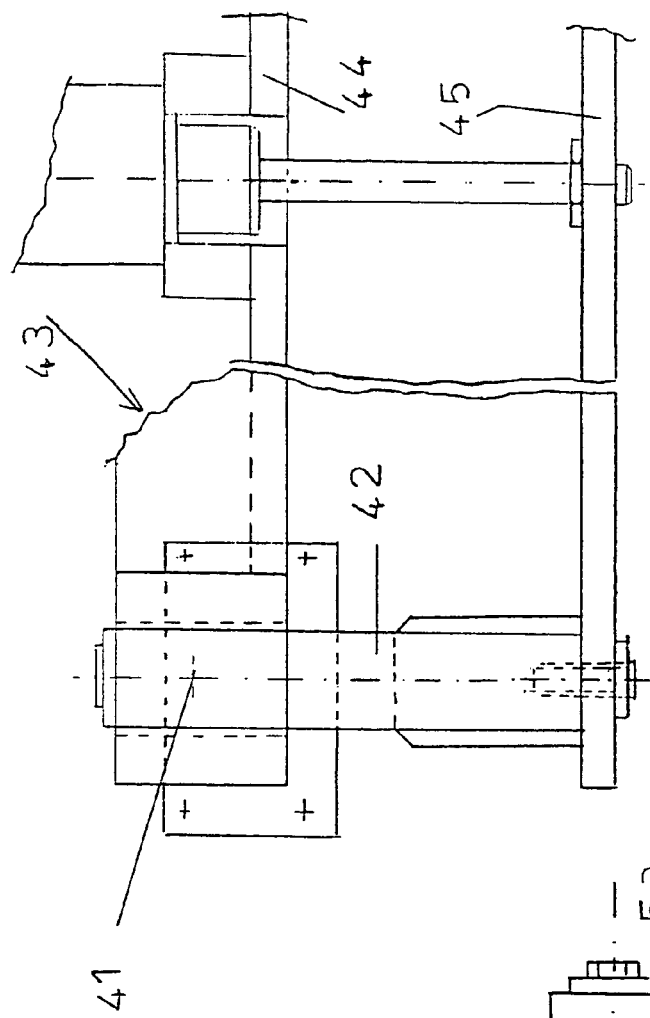
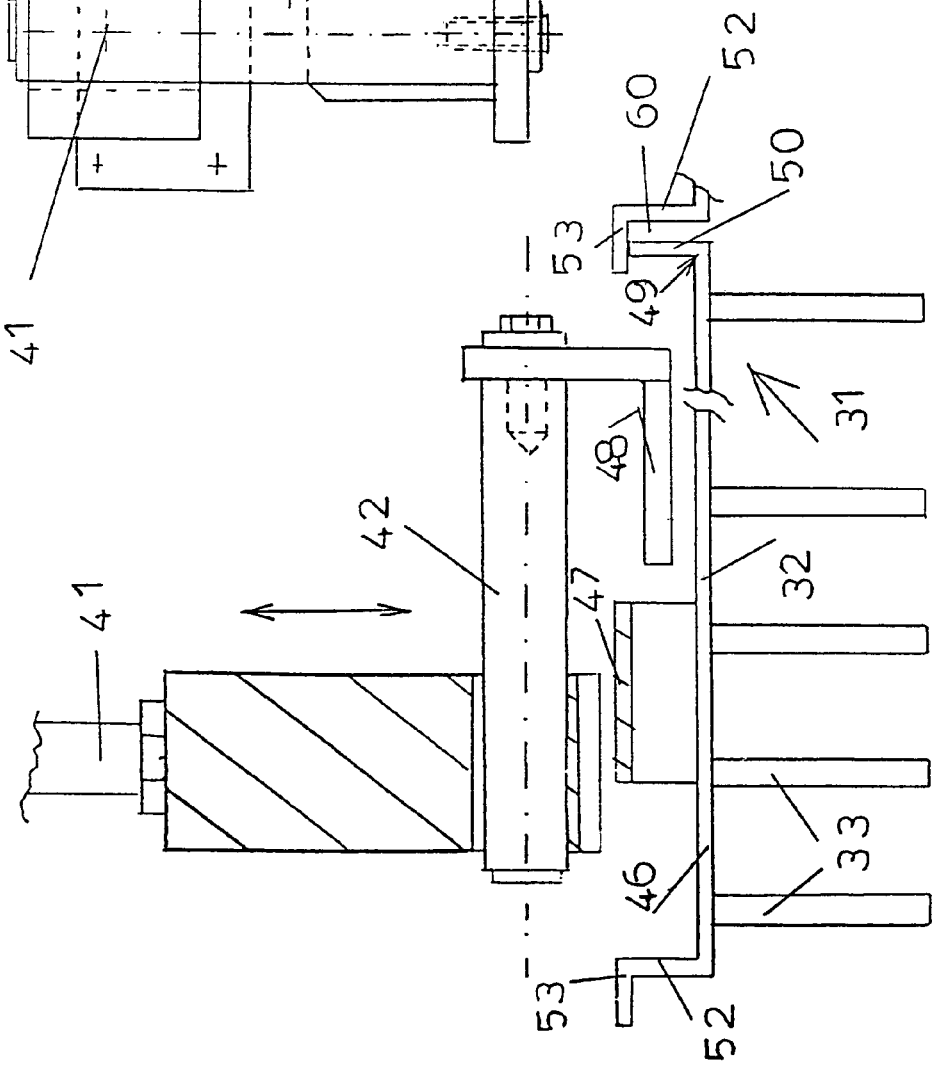

PROCESS AND PLANT FOR CONTINUOUS MANUFACTURE OF A FOAM LAYER

This application is a division of application Ser. No. 10/299,897, filed Nov. 20, 2002, now U.S. Pat. No. 6,998,077.

DESCRIPTION

The present invention refers to a process and a plant for continuous manufacture of a foam layer, comprising at least a plurality of geometrical figures obtained by impressing, according to predetermined outlines and sizes, such for example, holes, prints, relieves, recesses and the like, arranged in a high number and with order, mainly according to longitudinal and transversal rows.

Preferentially the said layer is made of latex foam and is devised to give rise, by cross cuts in succession throughout its whole length, different products, more preferentially products as mattresses, cushions and the like, or even composite products embodying at least a part of said layer.

Various processes for manufacturing latex foam products are known.

It is known, for instance, the use of moulds including a case closed by a lid hinged to the case, the inside of the lid being provided with a plurality of protuberances corresponding to the shapes of the recesses in the various products.

The hollow of the mould is filled with latex foam reaching a height such as to cover in its inside the various protuberances.

Foam vulcanization is obtained by heating metal parts and protuberances by means of pressurized steam.

In the end, the mould is opened and the product is manually extracted, taking it off from the various protuberances.

Processes for continuous manufacturing for example of products with recesses is described in patents of the applicant:

U.S. Pat. No. 5,229,138, U.S. Pat. No. 6,086,802, EP-B-0 380 963 are known as well.

Generally such processes comprise the step of injecting latex foam on a layer plane continuously moved between a first injecting station and a second station provided for the continuous removing of the layer; the vulcanization step is carried out while the layer is moving along a tunnel heated with pressurized steam and standing between the first and the second station.

The continuous process makes use at first of a height leveller of the layer standing just downstream the first station, followed by heating means of the layer placed before the vulcanizer for avoiding foam collapse and finally of a couple of rollers rotating in opposite directions to each other, for automatically extracting the vulcanized layer.

More in particular, the process described in patents U.S. Pat. No. 5,229,138 and U.S. Pat. No. 6,086,802 devices to inject foam on a layer surface from which a plurality of protuberances is projecting outwardly, each of them having an opened base, so to allow the penetration of pressurized steam inside the protuberances during their passage through the vulcanizer tunnel.

The layer surface described in patent U.S. Pat. No. 5,229,138 comprises a plurality of plates side by side among each other, each of them being provided with a plurality of protuberances projecting outwardly; such plates are joined at their sides to the links of two chains wound around two pulleys, respectively driving and driven pulley.

The plates form an annular ring surface that is uninterrupted for its whole extension, both in its upper and return stretch and in the connecting stretches of the upper and lower stretches around the two pulleys.

The layer surface described in patent U.S. Pat. No. 6,086,802 comprises a plurality of carriers, each of them provided with a laying plane, from which a plurality of protuberances project outwardly.

Carriers are moved along an annular configuration, delimited by a first stretch between the foam injecting station and the layer removing station and a second stretch devised to the return of foam-devoid carriers to the injection station.

At any moment, the first stretch is occupied by side by side carriers forming a single mould, whereas along the second stretch at least one carrier, or, in any case, a discrete number of carriers sensibly separated from each other, run.

Carriers of the first and of the second stretch are moved by different and independent operating systems and the speed of the carriers of the second stretch is sensibly higher than the one of the first stretch.

Carriers are mechanically linked to each other by means of levers, the second stretch being excluded.

Patent EP-B-0 380 963 devices to inject foam on a surface made by a metallic conveyor tape kept in continuous rotation by two rotating pulleys.

The foam layer, delimited by two faces, the inner one touching the tape and the external towards the top, is crossed perpendicularly to the external face, by special moulding means devised to form a plurality of upper recesses.

The moulding means are formed by a plurality of upper plates each of them provided with a plurality of protuberances projecting outwardly and aimed at producing the upper recesses of the layer.

Plates are joined to a conveyor element, formed by a plurality of slats, independent on one another and placed side by side to each other; the slats are laterally connected to the joints of two chains engaged in a closed ring configuration with two toothed wheels, respectively a driving and a driven wheel.

The slats comprise at their sides appropriate prolongations inserted in suitable guides of the fixed structure.

Plates are joined in their turn to the slats, since they comprise on the opposite face with respect to the protuberances, at least two stems, running in fitted holes of the slats.

Moreover, plates comprise lateral pins sliding along guides of the fixed structure placed respectively between the exit of the driven toothed wheel and the surface of the tape and between the surface of the tape and the entrance of the driving toothed wheel.

Said guides are shaped so that the pin of each plate travel along a gradual inclination portion between each toothed wheel and the surface of the tape for the laying of the foam.

During the progress of the chains between the exit of the toothed wheel and the entrance in the vulcanizer, the lateral pins of the plates run along the inclined guides of the fixed structure and the stems of the plates run along the holes of the slats associated to the chains; the protuberances approach in this way the continuous foam layer, the approach being determined by the sloping of the guides with respect to the tape.

Sinking of the protuberances inside the foam layer determines the moulding of a plurality of upper recesses.

At the exit of the vulcanizer, the pins of the various plates run along guides of the fixed structure and are directed by the tape towards the driving toothed wheel, so inducing a gradual separation of the protuberances from the recesses of the foam layer.

Therefore the processes described in the patents previously mentioned are suitable for continuous manufacture of latex foam products made up of a core delimited by two faces; some of such products have lower recesses having a determined height until a foam layer devoid of recesses, other ones have upper recesses having a determined depth until a foam layer devoid of recesses.

The total thickness of products is between 10 and 17 cm.

Starting from patent EP-B-0 380 963 the applicant has thought it possible to improve both:

The flexibility of the process referring to the formation of a continuous foam layer comprising at least on one face a plurality of moulding figures having predetermined outline and size to obtain different products and The steps for the moulding of the upper and lower parts of the products, taking care in particular of the steps for the foam stabilization and for determining the attractiveness and functionality of the final product.

To this purpose it was believed that a solution might be to open the ring-like configuration of the upper plates, so to make the plates apart from each other and independent of the progression steps of the foam laying surface, during the return pathway of the plates from the vulcanizer exit until the starting station of a new cycle, and to make the plates connected to each other and dependent on the progression of the laying surface, in the stretch extended between the sections upstream and downstream from the vulcanizer.

It was believed that such a solution could increase the speed of the upper plates in the return pathway compared to the speed of progression of the plates inside the vulcanizer, so reaching simultaneously both a reduction in the number of plates in the return stretch and the possibility of changing plates for new products with no interruption of the manufacture cycle.

It was further believed that the new solution could make use of upper plates mechanically linked to parts linked in their turn to the foam laying surface, so exploiting completely the related movement and motorization.

It was thought moreover that making use of upper plates disjoined from one another in the return stretch could allow an upper plate to be laid on the underlying foam layer overlapping one of its end to the end of a plate previously laid, so that the hermetic seal between contiguous plates should avoid the entrance of condensation drops inside the foam so avoiding undesired alterations of its chemical and physical properties.

It was finally perceived that the choice of upper plates disjoined from one another, and laid in sequence on the foam layer far apart from the vulcanizer entrance should form an impenetrable shield to the condensation drops otherwise cause of undesired marks on the external surface of the final product.

Thus in its first aspect the invention relates to a process for manufacturing a continuous foam layer, to be subdivided into single pieces, said process comprising the following steps of:

continuously moving a foam laying surface between two stations, respectively first and second;

laying near the first station the foam on the moving laying surface, up to a predetermined height and forming a continuous layer delimited by a first face touching the said laying surface, a second face opposite to the first one, and by two sides;

vulcanizing the latex foam between the said two stations; characterized by the following steps of a) moving towards the continuous layer before the vulcanization step a plurality of upper moulding plates, kept apart from one another, each of them having at least a bottom surface provided with moulding means for impressing upper figures with predetermined outline and size;

b) lowering in a moulding station each plate released from the other ones towards the laying surface, up to impress said moulding means on said continuous foam layer;

c) applying hermetically between each other the ends of the moulding plates adjacent on the continuous layer:

d) supporting the weight of the moulding plates by means of thrusts directed from the foam laying surface towards the top, keeping unchanged the said predetermined size of the moulding means of the plates inside the foam layer;

e) associating the moulding plates to the foam laying surface;

f) advancing the moulding plates together with the foam laying surface from the moulding position to an extraction position upstream the second station;

g) removing one at a time the plates from the foam layer in an extraction station upstream the second station.

Preferentially the process is characterized by the fact of moving said upper moulding plates, each having moulding means consisting of protuberances devised to impress upper figures comprising recesses and of lowering said protuberances in said moulding station on said continuous foam layer for a predetermined depth corresponding to an outline and a size predetermined of said recesses.

In a first actuation form the process makes use of plates, each of them having moulding means consisting of the same plate surface shaped in a corrugated way, that is, with teeth and similar, alternated to grooves; such teeth, starting from the base surface of the plate spread towards the top and/or towards the bottom, or even along the plate itself.

It is possible to have a first plurality of teeth directed towards the top followed by a second plurality of teeth directed towards the bottom and said pluralities, first and second, can have the same size and pitch values, or even different values.

Therefore, according to the mentioned actuation form, said teeth impress on a face of the continuous layer relieves due to the penetration of the foam material into the teeth directed towards the top, or grooves directed towards the inside of the foam. . . .

In a further actuation form the process makes use of plates having moulding means, arranged regularly or irregularly as previously mentioned, with the peculiarity that in the same plate or in different plates, areas are arranged with teeth or other moulding figures alternated for instance to smooth areas or to areas having relieved signs devised to draw and/or to represent trade suggestions, business names, trademarks.

Preferentially the process envisages to inject on the laying surface latex foam made of natural and/or synthetic rubber.

According to a particular actuation form the process plans the transferring of the moulding plates apart from each other, in inverted direction and in parallel to the movement direction of the foam laying surface, from a return station placed at a predetermined height with respect to an extraction station up to a supply station placed at a predetermined height with respect to the moulding station.

According again to this form of actuation the process envisages to move the moulding plates between the return and the supply stations at a higher speed with respect to the speed of the foam laying surface.

Preferentially the ratio between the speed of the moulding plates from the return station to the supply station and the speed of the foam laying surface is between 1 and 10.

Preferentially the process is characterized by laying the foam on a laying surface having a plurality of lower moulding protuberances and, more in particular, the laying surface consists in a plurality of contiguous laying planes forming a continuous surface between a first and a second station, between said two stations being interposed a third vulcanizing station; such a process comprises the further steps of removing the continuous foam layer having upper and lower recesses at the second station, of moving at least one laying plane devoid of foam from the second to the first station at a higher speed compared to the speed of the laying planes joined to one another in continuous sequence between the first and the second station.

According to a second aspect the invention relates to an article of latex foam, from natural or synthetic rubber, obtained by cross cuts in succession of the foam layer manufactured according to the previously mentioned process.

Among the articles particularly interested by the invention mattresses and pillows can be mentioned; such articles have preferentially lower or upper recesses, or both.

When recesses are present on both the faces, upper and lower recesses can have the same or different size and depth.

In a third aspect the invention relates to a plant for manufacturing foam products, of latex or the like, shaped as a continuous layer to be subdivided into single pieces, said plant comprising:

- a laying surface for the foam moving continuously between two stations, first and second;
- driving means for moving said laying surface;
- a device close to the first station for laying and forming a foam layer, said layer being delimited by a first face touching the laying surface, a second face opposite to the first one and two sides;
- a vulcanizer between the two stations;
characterized by the fact of comprising:
- a plurality of plates disjoined from one another, each of them containing at least a base surface provided with moulding means devised to impress figures having predetermined outline and size in the upper part of the layer;
- operating means for moving said disjoined and disconnected plates from a resting position, where said moulding means are above the layer, to an operative position in a moulding station, where said moulding means impress said figures and to remove said moulding means from the operating position up to said resting position;
- tight means between the ends of the plates placed adjacent to each other on the continuous layer;
- supporting means to support the weight of the plates by means of thrusts directed from the laying surfaces towards the top;
- means for joining the plates to the laying surface of the latex foam;
- means for advancing forward the plates together with the laying surface of the latex foam from the moulding position to an extraction position before the second station;
- means for removing each single plate apart from the other in an extraction station upstream the second station.

Preferentially said plates comprise moulding means consisting of protuberances intended to constitute recesses, said protuberances being oriented in a perpendicular direction to the faces of said layer at least in a space between said two stations.

Advantageously the plant is characterized by the fact that said means for supporting the weight of the moulding plates, said means for joining the moulding plates to the laying surface of the latex foam and said means for advancing forward the moulding plates until the extraction position, are coincident.

Still preferably, said tight means comprise in each plate ends, which are overlapped to the ends of the contiguous plates.

Such an overlapping may be realized by shaping the ends of the plates according to different embodiments.

Among other things it is underlined that the ends of the plates can be shaped according to different heights with respect to the base surface of the same plate provided that the base surfaces of all the plates are maintained at the same level with respect to the laying surface of the foam; in this way the sinking of the upper protuberances into the foam is the same.

Preferentially said tight means comprise in each plate ends which are asymmetric with respect to a center plane perpendicular to the base surface of the plate.

Alternatively, said tight means may consist of seals made with rubber placed at both the ends of each plate so that a head to head tightness between contiguous plates is realized.

According to a further solution said tight means may comprise in each plate a first end shaped with a concavity towards the external space and a second end shaped with a convexity so that contiguous plates may realize the tightness between complementary ends by means of a groove-and-tongue joint.

According to a preferred embodiment said supporting means provides on the foam laying surface points of support and thrust for the transverse ends of the plates which are devoid of the protuberances in such parts.

Advantageously such points consist of the lateral walls, which delimit the width of the continuous layer.

Preferentially the plant envisages that said means for moving in a moulding station each plate disconnected from the others and said means for removing the plates from the laying foam comprise a first and a second operating system, for example an oil-pressure system or the like.

Preferentially the plant comprises means for transferring separately the plates from the return up to the supply station and in particular said means for transferring the plates comprises two conveyor belts placed side by side for supporting the lateral parts of the plates.

According to a fourth aspect the invention is related to an article with recesses of latex foam manufactured with a plant as previously mentioned.

BRIEF DESCRIPTION OF THE DRAWINGS

The present invention will be better understood by means of the following description and of the enclosed figures made by way of non limiting example with reference to the attached sheets of drawings in which:

FIG. 6 is a longitudinal partial view of the preliminary steps for the extraction of the plates;

FIG. 7 is a top view showing the operating system for engaging and disengaging the plates;

In FIG. 1 a plant 1 is shown for manufacturing a continuous layer 2 of latex foam of unlimited length produced between a first station 3 provided with a foam injecting device 4 and a second removing station 5 comprising two rolls 6 rotating in opposite directions to each other for carrying away the continuous layer passing between them.

Between the injecting and the removing station a vulcanizing station comprising a device for vulcanization, for instance a tunnel-type vulcanizer, is placed.

The continuous layer, after the removing step, is subdivided into a plurality of single articles, by successive cross cuts.

Figure 2:
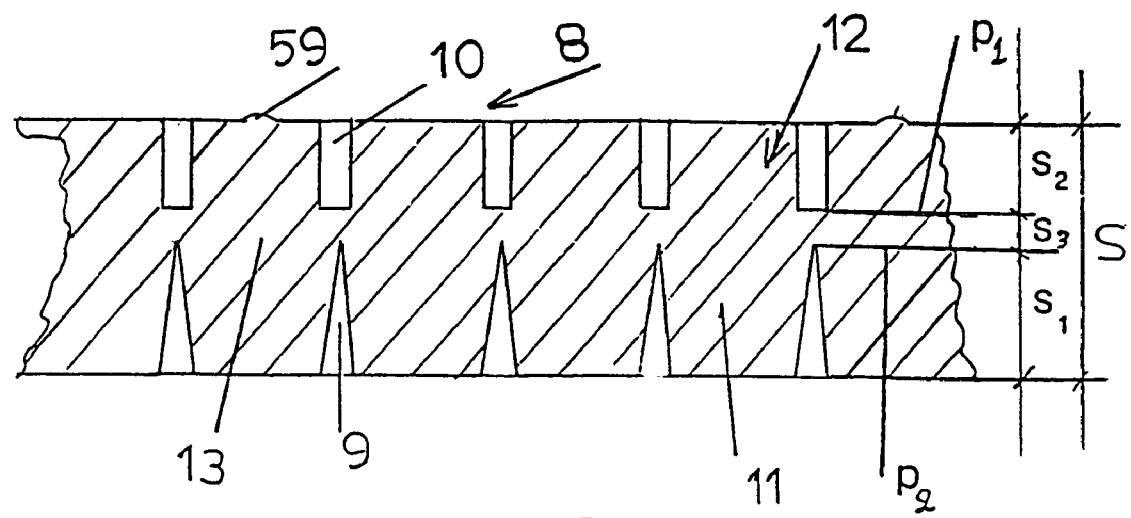
FIG. 2 is a cross section view of a product with recesses obtained by means of the plant of FIG. 1.

In FIG. 2 a portion of an article is shown; in the example a mattress 8 continuously manufactured by the plant 1.

Such a mattress is made by a core of natural and/or synthetic latex foam having a total thickness S and is crossed in its lower face by a plurality of recesses 9 and in its upper face by a plurality of recesses 10.

The recesses 9, 10 are placed according to a predetermined and wished geometry, respectively along a lower zone 11 of thickness $s_1$ and along an upper zone 12 of thickness $s_2$; between the two zones, upper and lower, a third zone 13 devoid of recesses having thickness $s_3$, is interposed.

Figure 1:
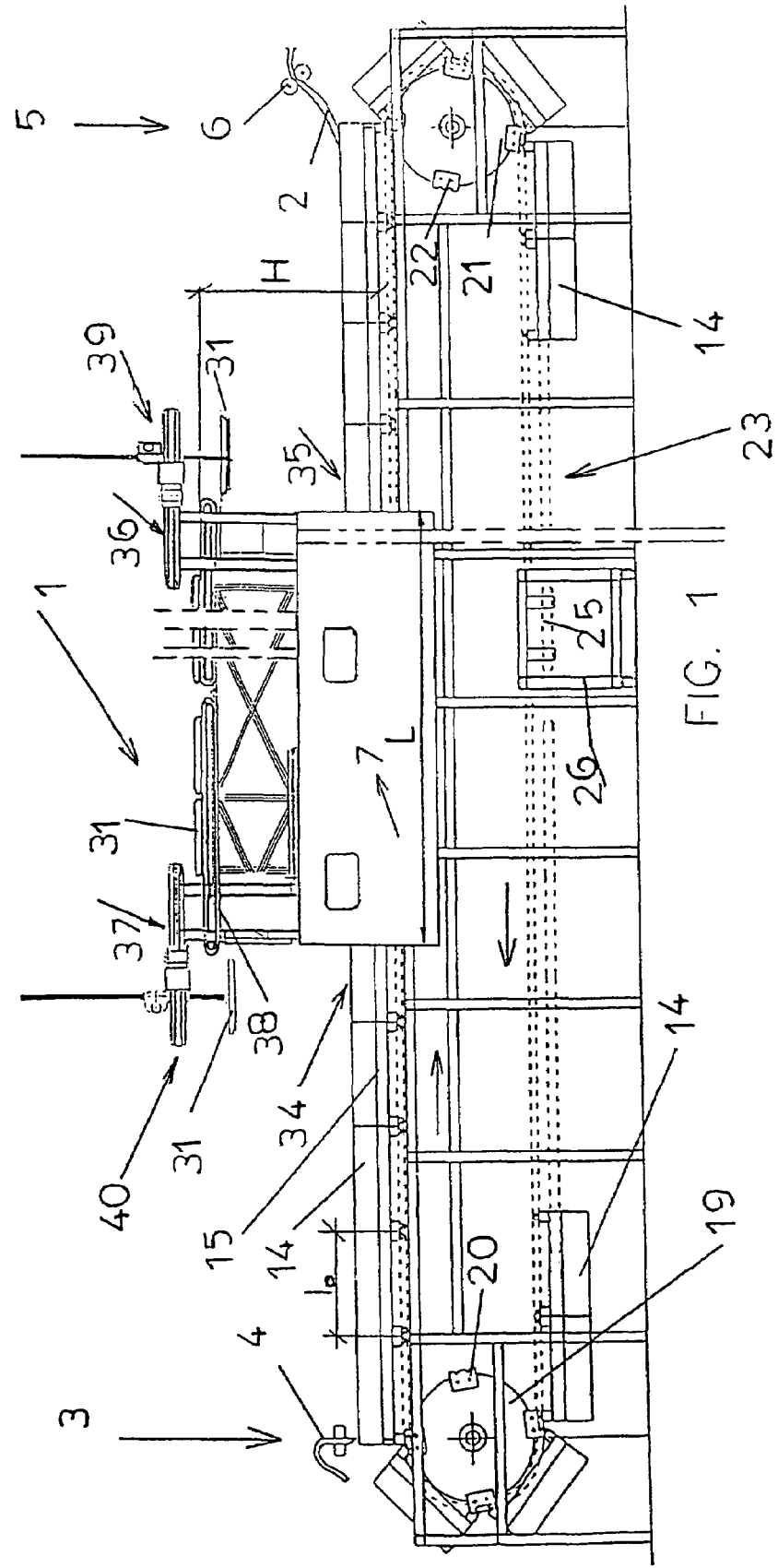
FIG. 1 is a longitudinal view of the plant.

With regard to FIG. 1, the plant 1 comprises a lower and an upper portion, respectively the first one for forming the whole foam core and the recesses 9, the second one for forming the upper recesses 10.

The lower portion of the plant comprises a plurality of carriers 14 each provided (FIG. 3) with a laying plane of the foam 15 where a plurality of protuberances 16 projecting outwardly are disposed in order to form the lower recesses 9.

The carriers run along a first stretch between the injecting station 3 and the removing station 5 of the layer 2 and along a second stretch underlying the first one for the return of the carriers.

FIG. 1 shows the movements of the carriers by means of arrows.

The width of the laying plane of each carrier is delimited by two vertical walls 17, 18, the latter being movable among the rows of the protuberances 16 for varying the length of the single mattresses obtained by successive transverse cuts of the continuous layer 2 after the removing step.

It has to be pointed out, as will be clarified later, that said lateral walls are particularly suitable for the functioning of the upper portion of the plant.

The carriers are in contact with each other along the whole first stretch between the injecting station and the removing station, being moved at a first speed by the thrust received by the rotation of the driving pulley 19.

Said driving pulley comprises appropriate cavities 20 circumferentially staggered and suited to grasp the shafts of the carriers.

Figure 3:
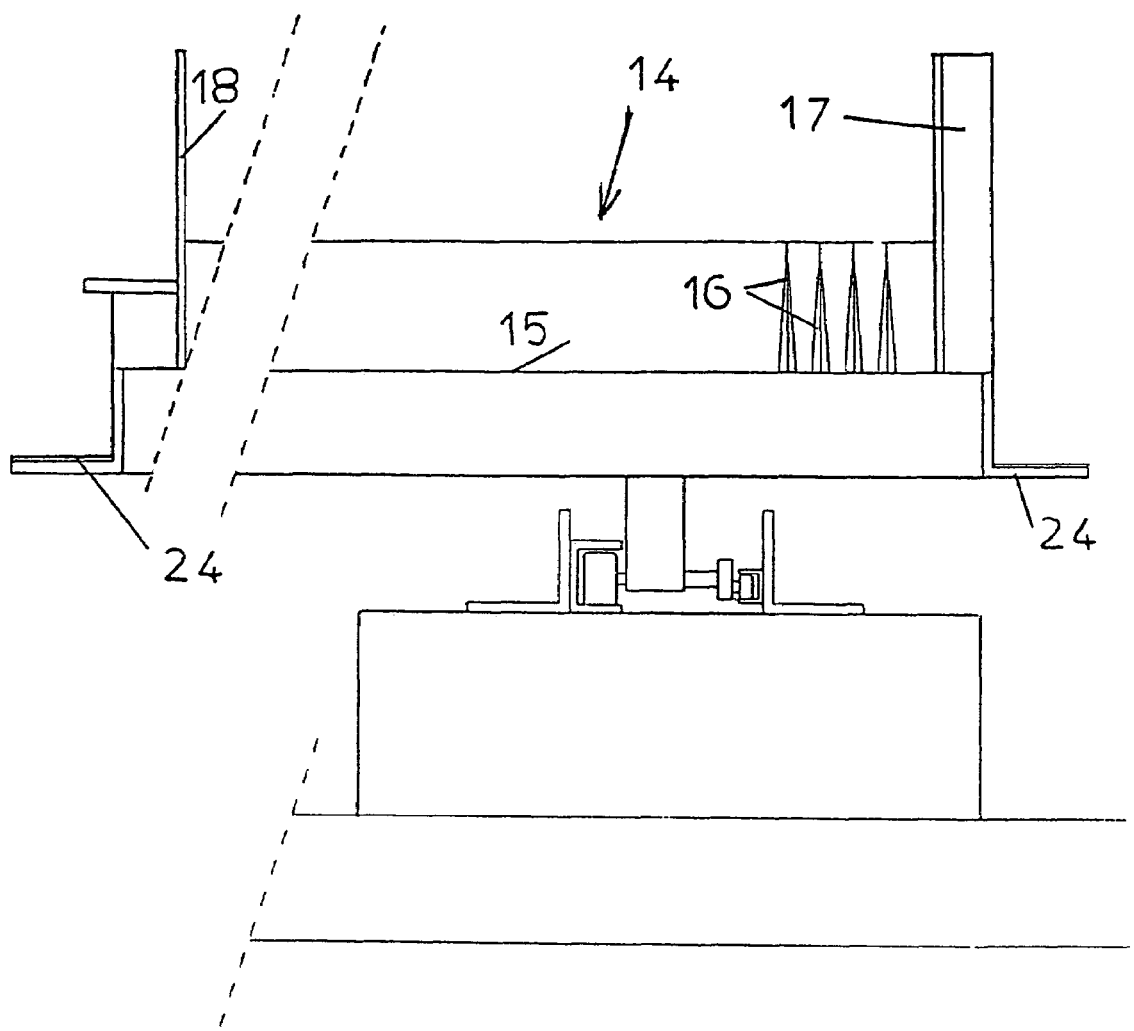
FIG. 3 is a partial cross section of a carrier provided with protuberances used in the lower portion of the plant in FIG. 1.

Said shafts, as clearly shown in FIG. 3, support a group of wheels, which are idle, mounted to run along guides placed on the fixed frame of the plant.

The carriers devoid of the layer 2 after the removing station 5, travel along a driven pulley 21 provided with cavities 22, like those previously described; said carriers are taken by an operating system, for example chains driven by their own engine.

The carriers rest with their weight on appropriate supporting flanges 24 of the chains, hence the carriers are carried away at the same speed of the chains.

The operating system may comprise several conveyors all moved at the same speed and one of the conveyors 25 may be associated to a frame 26, for moving a carrier in a transverse direction to the longitudinal development of the plant, for maintenance operation, change of tools or other operations; with no interruption of the manufacturing cycle.

The carriers are mechanically connected (FIG. 4) by means of appropriate levers 27 and pins 28 placed between adjacent carriers for the whole length of the plant with the exception of the second stretch of return.

Figure 4:
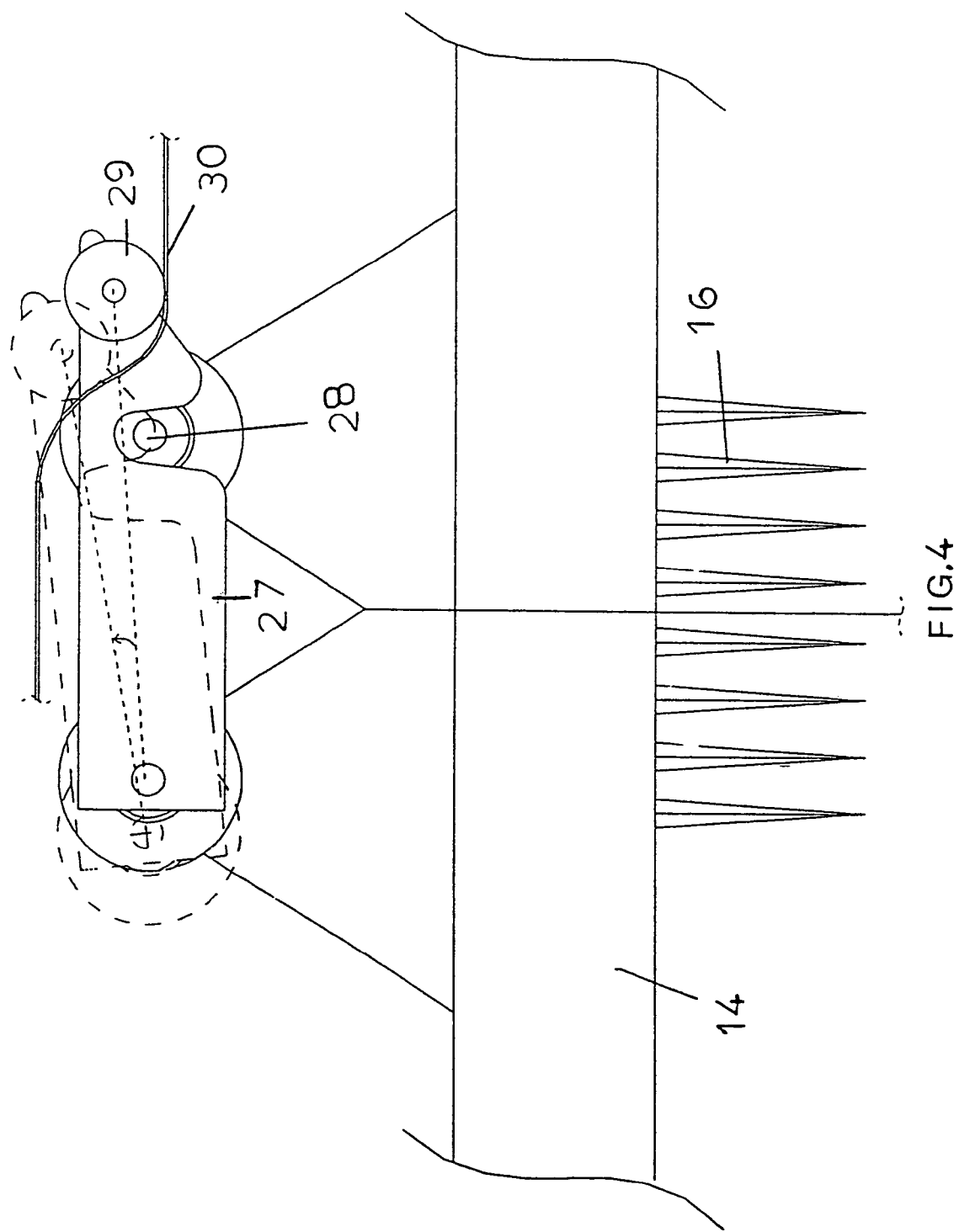
FIG. 4 shows partially two contiguous carriers and their connecting mechanism.

As shown in FIG. 4, said carriers come to the second stretch disjoined between them when a sheave 29 of the lever 27 disengages the connection between adjacent carriers by interfering mechanically with a slope 30 of the fixed structure. The carriers are then connected between them by means of slopes having opposite inclination to that of FIG. 4 before entering the driving pulley.

Figure 5:
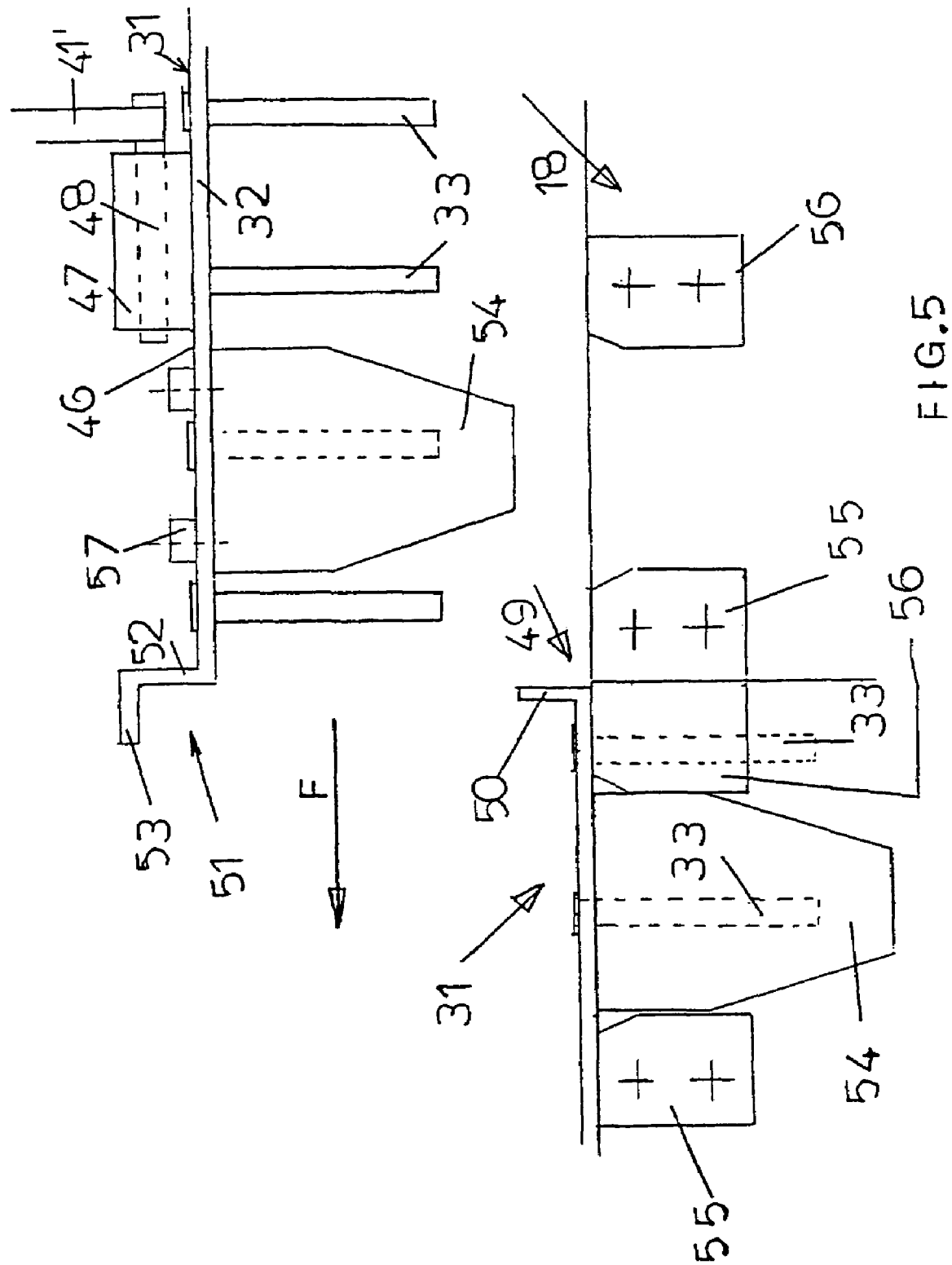
FIG. 5 is a partial longitudinal view of the plant of FIG. 1 showing the loading on the foam layer of upper plates provided with protuberances.

The upper portion of the plant comprises moulding means constituted by a plurality of plates 31 partially and schematically shown in FIG. 1 and in greater detail in FIGS. 5, 6.

Each plate 31 is provided with at least a base surface 32; from it a plurality of protuberances 33 projects outwardly.

Said protuberances 33 have shapes corresponding to the upper recesses 10 shown in FIG. 2.

The plates 31 are moved along a third and a fourth stretch both parallel to the foam laying plane.

Said third rectilinear stretch crosses the vulcanizing device 7 through its whole length and is placed between a moulding station 34 and an extraction station 35 of the plates.

The fourth rectilinear stretch is placed between a return station 36 and a supply station 37.

The return and supply stations are placed at a predetermined distance H with respect to the foam laying plane and are connected between them by one or more conveyor belts 38 carrying the plates 31.

The plant includes two operating systems 39, 40 near the return and supply stations; for example said operating systems are of the fluid dynamic type or of other types working in similar way; each operating system comprises two stems which are active for two movements, a first one in horizontal direction, and the other in a perpendicular direction.

The first operating system 39 comprises (FIG. 6) two stems 41, 42, which are active for the sliding, the grasping and the laying of the plates 31 both perpendicularly and in parallel to the foam laying surface, in both directions.

More in detail, the first stem 41 is movable towards the bottom on the extraction station 35 for taking each plate 31 from the foam layer and upwards in opposite direction up to reach the position where the second stem 42 of the same operating system is active.

The second stem 42 is movable horizontally in one direction to transfer each plate one at a time towards the return station above the conveyor belt 38 and in opposite direction to come back to the previous position.

Furthermore, the second stem 42 is horizontally movable in one direction and in the opposite one for connecting and releasing the plates.

According to a realization form, partially and schematically shown in FIG. 7, the operating system 39 comprises a group cylinder-piston 43 having the task of actuating the sliding of the second stem.

In FIG. 7 the trace of the first stem 42 perpendicular to the plane of the drawing is schematically shown.

According to this solution, the casing of the cylinder is connected to the outside structure 44 associated to the first stem 41 and the end of the piston is associated to the support 45 where an end of the second stem 42 is connected The second operating system 40 comprises two stems having horizontal and vertical movements in both directions devised to move the plates 31 from the supply station 37 to the moulding station and vice versa.

The second operating system is not described in detail being like the one of the first operating system, hence the parts of the second operating system identical to the ones of the first operating system will be indicated through the same numeral references provided with apex.

The plates 31 are manufactured according to particular features ensuring both the right moulding of the upper recesses 10 and the physical and chemical properties of the final product.

As clearly shown in FIGS. 5, 6, each plate 31 comprises at least a hollow seat 47 on the upper face 46; said upper seat is substantially shaped as a cylinder and is suitable for the insertion of at least a grasping cylindrical element 48 belonging to each operating system 39,40.

Particularly, the plates 31 have their ends asymmetrically shaped with respect to a central plane directed perpendicularly to the respective faces.

More in detail, the first end 49 is bent for a first tract 50 at a right angle with respect to the face 46 and a second end 51 is bent a first time for a second tract 52 at a right angle with respect to the surface along the same direction and sense of the first tract 50, and bent a second time outwardly for a third tract 53 which results parallel to the face 46 of the plate.

Besides, said first and second tract 50, 52 have the same height with respect to the face 46.

The plates 31 along the third stretch rest with their whole weight through their lateral portions devoid of protuberances on the lateral walls 17,18 (FIG. 3) of the carriers and the plates are carried away at the same speed of the carriers.

Preferably, the plates 31 with the protuberances 33 are made of aluminium as well as the laying planes of the carriers and the respective protuberances 16.

According to a preferred realization the plates 31, as well the lateral walls 17, 18 of the carriers comprise means to center reciprocally plates and carriers.

More in particular, said means for centering comprises (FIG. 5) wedges 54 placed on the side of each plate and couples of plugs of reference 55,56 associated to the lateral walls 17,18 of the carriers by means of welding or riveting or sticking or other means of reciprocal connection.

The distance between the plugs of reference of a pair corresponds substantially to the width of the wedge 54.

Said wedges are connected to the plates by means of connection 57 between bolts and nuts or by other equivalent means.

The functioning of the plant is now described.

Each carrier 14, before the vulcanizer 7, reaches the entry of the moulding station 34 according to the sense of the arrow shown in FIG. 5 when a plate 31 associated to the first stem 41' of the operating system 40 is moved towards the bottom.

When the carrier is in correspondence of the moulding station the stroke of the stem 41' is such that the protuberances 33 of the plate 31 are sunk into the foam layer laid on the underlying plane 15 of a carrier.

The protuberances of the plate 31 pass through the foam layer up to a depth determined by the insertion of the wedges of the plate between the couples of plugs of reference 55,56 up to the stop of the lateral surfaces of the plate against the upper edges of the lateral walls 17,18.

Consequently the foam layer of height "S" lying on the laying plane of the carrier advances towards the vulcanizer 7 being crossed both by the plurality of the lower protuberances 16 for a thickness s1 and by the upper protuberances 33 for a thickness $s_2$.

It is pointed out that the contiguous plates 31 comprise means suitable for the tightness; such means are realized by the particular asymmetric configuration of the ends 49, 51 of each plate.

As shown in FIG. 5, the plate 31 which has been already laid on the foam layer advancing according to the direction of the arrow F has the first end 49 in line but at a distance from the second end 51 of a further plate 31 carried from the stem 41'.

Therefore, said further plate 31 at the end of the stroke of the stem 41' will bring the head portion 53 in contact with the end portion 50 of the plate previously laid originating an air-tight locking between the contiguous plates both from the outside towards the inside of the foam and vice versa.

Each carrier, subsequently associated to a plate 31 as previously described, passes through the tunnel of the vulcanizer 7 at the speed imparted to the carrier by the thrust received by the driving pulley 19 (FIG. 1).

The vulcanization of the foam layer which is closed between the laying plane and a plate is carried out supplying heat by a warming fluid injected into the tunnel, for example steam at high pressure.

The heat of vulcanization is transferred to the mass of foam through the metallic parts of the laying plane of the carrier and of the plates as well as through the upper protuberances associated to the plates and the lower protuberances associated to the carrier.

Preferably the lower protuberances are shaped so to have an opened base on the laying plane of the carrier, which has a thickness between 2 and 12 mm.

The lower protuberances having opened base favour the entry of the fluid into the cavities of the same protuberances so that the distribution of the heat in the surrounding space is optimized.

The thickness of the plates 31 is between 2 and 10 mm and the protuberances 33 projecting outwardly from the plates may be realized as a solid body, i.e. with a full instead of an empty section.

The latter solution is possible being the weight of the protuberances and of the plates, even if great, released on the rigid structure of the sidewalls 17,18 of the carriers, which may be realized using a metallic material such as for example aluminium.

According to another solution, the upper protuberances are opened at their bases and still in another solution the lower protuberances are closed at their bases.

Each carrier leaving the vulcanizer 7 moves towards the entry of the extraction station 35 where the first operating system 39 has been already actuated moving towards the bottom the first stem 41.

As soon as the carrier reaches the extraction station, the stem 41 (FIG. 6) is entirely extended whereas the second stem 42 shows that the grasping element 48 is axially close to the hollow seat 47 of the plate 31 still associated to the carrier.

The operating system actuates, according to a quick sequence, at first the horizontal movement of the stem 42 up to insert the grasping element 48 into the hollow seat 47, then a further movement of short stroke of the stem 42 so that the end portion 50 of the plate 31 is released from the end portion of the nearest adjacent plate and finally the upwards movement of the stem 41 with the plate 31 towards the return station 36.

Then, the extracted plate is laid on the conveyor belt 38 for its transferring to the supply station 37, so to begin a further moulding cycle in combination with a carrier.

Preferably, the conveyor belt comprises two lateral chains, which are placed in parallel and at a reciprocal distance for allowing the sides of the plate to rest on the links of the chains.

The continuous layer 2 is then extracted by the system of rolls 6 assuming the shape of a body of unlimited length comprising a plurality of lower recesses 9 and upper recesses 10. . . .

Many advantages result from the process and the plant according to the invention.

Indeed, the final product carried out by the process according to the invention has homogeneous features through its whole foam core.

Such a result comes from the perception that a not uniform final product might be originated by adopting upper plates at first disconnected among them and then continuously placed along the stretch towards the vulcanizer.

In fact, it was held that the plates coming back from the extraction station and reaching the moulding station would have been subjected to a cooling, thus entering the vulcanizer at a lower temperature compared to the one inside the vulcanization tunnel.

In these condition, the steam in contact with the plate surface would have been cooled originating drops of condensate, which could slide, and fall into the space between adjacent plates.

Such drops of condensate could originate holes of some depth into the upper foam layer locally avoiding the foam cross-linking and lowering the foam height in these sites with respect to the total wished thickness of the final product.

Having perceived such a problem, a solution has been found out by adopting tight means between adjacent plates.

Said tight means, according to the preferred realization form, are constituted by asymmetrical ends, present in each plate and associated to those of the adjacent plates through reciprocal overlapping.

Advantageously, the partial covering between adjacent plates, according to the mentioned embodiment or in any case through similar methods, originates an impenetrable barrier, avoiding the penetration of condensation from the outside of the plate towards the foam core.

The result is a homogeneous foam layer clearly visible in the final product.

Indeed, as clearly shown in the cross section of FIG. 2, the mattress 8 has relieves 59, substantially curvilinear, projecting outwardly from the upper surface 12 with a height of few millimeters.

Said relieves are substantially realized in such a way that the tight means, in any whatsoever way, leave a closed space 60 (FIG. 6) towards the outside, forming localized zones that allow the accumulation of foam and are regularly distributed at a reciprocal distance equal to the length of each plate.

Practically, the relieves 59, so as the similar ones obtained by tight means equivalent to the preferential embodiment, represent a visual signal both for the manufacturer and the user, certifying that no drops of condensated steam have crossed the foam layer.

Advantageously, it is possible in this way to identify immediately the wished features of homogeneity in the final product. . . .

According to an actuation example of the process, the relieves 59, whatever being their shape, regular or not, have a transverse size of their base between 0.5 and 8 mm and a height between 0.5 and 7 mm.

Figure 8:
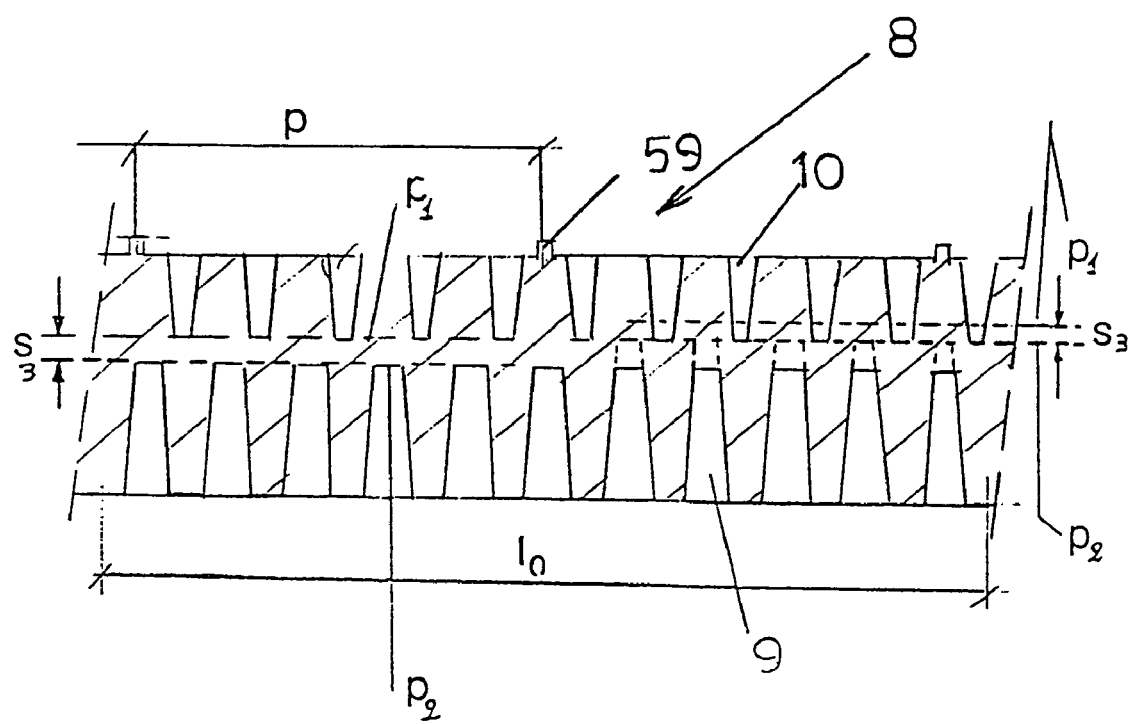
FIG. 8 is a partial longitudinal section of an article manufactured with the plant of FIG. 1, having recesses different from those of FIG. 1.

As shown in FIG. 8, a mattress 8, manufactured by the plant of FIG. 1, comprises relieves 59 having a pitch "p" between 10 and 90 cm.

Advantageously, according to a specific realization, it is possible to place, along the longitudinal direction of the plant, many groups of plates of the same length provided with protuberances; among them a plate of smaller length and devoid of protuberances is interposed.

Said interposed plate is provided with means to impress commercial inscription or alike on the surfaces of the various mattresses.

Further advantages are due to the plurality of protuberances 33 of each plate which are sunk into the upper portion of the foam still before entering the vulcanizer.

It is to be pointed out that the known processes, carried out using a laying surface where foam is injected among the various protuberances, are substantially suitable to manufacture foam layers having a maximum height of about 17 cm, approximately 5 cm of it being referred to the upper zone devoid of recesses.

According to the known technique, the protuberances on the foam laying surface, which consists of a continuous tape or of contiguous laying planes, are adequate to carry out the vulcanization of the upper zone of 5 cm of the foam.

Manufacture of foam layers having thickness more than 17 cm is not satisfying.

In fact, a first problem rises from the foam viscosity: the increase of the height of the protuberances above the known values prevents the foam from reaching the laying surface between two contiguous protuberances; practically, the foam slides down to their base along the walls of the two protuberances, leaving an empty space between them near the laying surface.

Consequently, the final product would have not vulcanized lower zones.

Another problem is due to the fact that the upper portion of the layer not crossed by the protuberances does not receive enough heat to be cross-linked; in fact the lower portion of high thickness of the layer behaves as a heat insulating for the upper portion.

In particular, the upper portion of the foam, owing to the increased thickness of the layer would tend to collapse.

In other words, a product having height greater the known products would not be satisfying.

The applicant, having perceived that the protuberances of the upper plates constitute means for the stabilization of the foam, both during the movement towards the vulcanizer and along the first stretch of the vulcanizer, has held it possible to carry out a process for manufacturing a foam continuous layer having a higher thickness than the one existing in the market.

Said protuberances of the upper plates originate stability into the foam which is still in an unstable physical condition.

In practice, the innumerable foam portions, which are located into the net originated by the numerous protuberances, adhere to the surfaces of the protuberances themselves, so advantageously counteracting the foam tendency of the still not stable form, to collapse.

Advantageously, the simultaneous presence inside the foam of the lower protuberances 16 of the carriers 14 and of the upper protuberances 33 of the plates, increases the stability of all the foam layer before its entering into the vulcanizer and along the first stretch of the vulcanizer where the foam is not well settled yet.

Moreover the simultaneous presence of the lower and of the upper protuberances into the foam when the carriers pass along the tunnel of vulcanisation, makes the whole foam core chemically stable and uniform, even if its thickness is higher than the one present on the market, so providing for the desired final elasticity of the product.

With reference to FIGS. 2 and 8 the sizes of the products manufactured according to the process of the invention, preserving the physical and chemical features imposed by the rules, are here below indicated:

total thickness "S" between 7 and 35 cm;
ratio $s_2/S$ between the thickness of the upper zone $s_2$ and the total thickness S lower or at most equal to 0.5.
ratio $s_3/S$ between the distance of the two planes $p_1$ and $p_2$ delimiting the inner ends of the lower and of the upper recesses and the total thickness S included in the range between 0 and 0.5.

The previous mentioned sizes can be similarly applied to articles comprising upper and lower recesses differently shaped between them.

In this regard FIG. 8 shows, according to a partial view and in a longitudinal section a foam layer devised to form, after successive transverse cuts, a mattress 8 provided with upper and lower recesses not aligned between them and differently shaped compared with the recesses of FIG. 2.

Moreover, the upper and/or the lower recesses may be extended up to reach the lower and the upper zones of the layer, as clearly shown for the lower recesses by dashed line drawn in the right side of FIG. 8.

The mattress of FIG. 8 comprises relieves 59 shaped as small teeth distanced apart from each other according to a pitch "p" which corresponds to the length of the plates 31 measured along the longitudinal direction of the plant 1. According to the described example, the pitch "p" is less than the length "$l_o$" of the laying planes 15 of each carrier; said length "$l_o$" corresponding to the transverse size of the mattress.

According to the general realization the plant 1 of the invention envisages that the manufacture of the mentioned products is carried out using determined sizes both of the carriers and of the upper plates.

It has been found particularly advantageous to confer to the laying planes 15 of the carriers a length "$l_o$" between 180 mm and 1100 mm measured in the longitudinal direction of the foam movement and a transverse width included in the range between 1600 and 2500 mm.

In combination with the above mentioned sizes of the carriers, it has been found profitable to confer to the upper plates a length "p" included in the range between 100 and 900 mm and a width in the range between 1600 and 2700 mm.

In relation to the above embodiments, the thickness of the upper and lower protuberances 33, 16 has particular values.

Particularly, the number of the upper protuberances is included substantially between 3 and 90 protuberances/$dm^2$ and the number of the lower protuberances is included between 6 and 84 protuberances/$dm^2$.

A further advantage of the invention is originated by the upper portion of the plant, which exploits the features of the lower portion of the same plant.

In fact, the walls 17,18 (FIG. 3) of each carrier are contemporaneously both means for delimiting the length of the mattresses obtained after successive cuts along the continuous length and means for supporting, joining, and advancing the plates 31.

The walls 17, 18 made of a rigid material, such as metal, may be specifically sized both for supporting the weight of the plates 31 and of the numerous protuberances as well as for releasing the vertical force on the rigid structure of the carriers.

Moreover, it is underlined that according to the invention, the steps of extraction, return and lying of the plates avoiding the use of a transmission having a closed ring configuration allows advantageously to carry out the partial or total change of the plates and to introduce new plates without interrupting the manufacturing cycle.

Additionally, it is to be noted that the system for the movement of the carriers along the return stretch of the plant is not mechanically connected to the system for the forward movement of the carriers which are loaded with foam; this feature allows advantageously to carry out a number of many different changes in the plant without interrupting the manufacturing cycle of the foam layer.

In other words, it is possible to change the sizes of one or more carriers, and contemporaneously or in successive times, to modify the sizes of one or more plates without stopping the plant.

Advantageously, it is possible to change all the plates belonging to a predetermined cycle according to which the protuberances are in line with the protuberances of the carriers and to introduce with no interruption of the manufacturing cycle new plates provided with protuberances of any shape different or of the same type of the previous ones, but staggered with respect to those of the carriers; or again, during a predetermined time, it is possible to avoid the use of the upper plates and the moulding of the upper recesses for a certain continuous tract of the layer, and subsequently, to begin to mould contemporaneously a continuous layer having upper and lower recesses without interrupting the manufacturing cycle.

Additionally, a further advantage is that moving along the vulcanizer the foam layer undergoes a capillary cross-linking for the presence of the upper and lower protuberances, consequently the mass of foam acquires good elasticity, so that it is then easy the automatical extraction of the foam layer from the protuberances without risk of tearing.

Moreover it is possible without changing the chemical compound to change widely the deformability feature of the final article, relying on all the possible combinations of shapes and sizes of the upper and lower recesses.

In practice, without breaking the manufacturing cycle, a continuous foam layer can assume, along different stretches, a different and wished deformability; therefore after successive transverse cuts, it is possible to produce, for example, mattresses of different wished elasticity so satisfying the various demands of the market.

Though some forms of actuation of the present invention have been shown and described, all possible changes accessible to a technician of this field are meant to be included.

For instance, the laying planes of the latex foam could comprise lower plates, each of them being provided with protuberances to mould lower recesses; said lower plates are reciprocally connectable with hinges and associable to chains meshing with two toothed pulleys of a driving system.

Moreover, the products manufactured according to the plant of the invention, can be marketable as household or sanitary articles, or as articles for military use or even as parts of composite articles used for resting or sleeping; the latter ones comprising one or more layers with recesses interposed to continuous layers devoid of recesses and/or associated to different elements as for example elastomeric or metallic springs, as well as layers of materials different from a foam.

Though the description has been referred preferentially to a plant for the manufacture of products of latex foam from natural and/or synthetic rubber, it is evident that the plant is devised to manufacture also different kinds of foam and among them the polyurethane; in this latter case the vulcanizer is substituted by a device suited to determine the chemical and thermal stabilization requested by the nature of the particular foam.

The invention claimed is:

1. Plant for manufacturing foam products, of latex, shaped as a continuous layer to be subdivided into single pieces, said plant comprising:
    a laying surface for the foam moving continuously between two stations, first and second stations respectively;
    driving means for moving said laying surface;
    a device close to the first station for laying and forming a foam layer, said layer being delimited by a first face touching the laying surface, a second face opposite to the first one and two sides;
    a vulcanizer between the two stations;
    wherein the plant comprises:
    a plurality of plates disjoined from one another, each of them containing at least a base surface provided with moulding means devised to impress figures having predetermined outline and size in the upper part of the layer;
    operating means for moving said disjoined and disconnected plates from a resting position, where said moulding means are above the layer, to an operative position in a moulding station, where said moulding means impress said figures and to remove said moulding means from the operating position up to said resting position;
    tight means between the ends of the plates placed adjacent to each other on the continuous layer, said tight means between ends of contiguous plates for producing a hermetic seal between the contiguous plates to avoid penetration of condensation drops inside the foam;
    supporting means aimed to support the weight of the plates by means of thrusts directed upwardly from the laying surfaces;
    means for joining the plates to the laying surface of the latex foam;
    means for advancing forward the plates together with the laying surface of the latex foam from the moulding position to an extraction position before the second station;
    means for removing each single plate apart from the other ones in an extraction station upstream of the second station.

2. Plant according to claim 1, wherein said plates comprise moulding means consisting of protuberances for forming recesses, said protuberances being oriented in a perpendicular direction with respect to the faces of said layer at least in a space between said two stations.

3. Plant according to claim 1, wherein said means for supporting the weight of the moulding plates, said means for joining the moulding plates to the laying surface of the latex foam and said means for advancing forward the moulding plates, are coincident.

4. Plant according to claim 1, wherein said tight means comprise in each plate ends overlapping the ends of contiguous plates.

5. Plant according to claim 1, wherein said tight means comprise in each plate ends which are asymmetric with respect to a center plane perpendicular to the base surface of the plate.

6. Plant according to claim 5, wherein each plate comprises a first end bent for a first portion at a right angle with respect to the base surface and a second end bent a first time for a second portion at a right angle with respect the base surface along the same direction and sense of the first portion, and bent a second time outwardly for a third portion which results parallel to the base surface of the plate, said first and second portion being of the same length, the head of the first portion of a plate being in tight contact with the inside surface of a third portion of a second plate contiguous to the first one.

7. Plant according to claim 1, wherein said supporting means of the weight of the plates are made by providing, on the laying surface of the foam layer, two lateral walls which delimit the width of the continuous layer, said walls constituting points of support and of thrust for the transverse ends of the plates.

8. Plants according to claim 1, wherein said means for removing each single plate apart from the others comprise a first operating system placed at a predetermined distance from the laying surface of the contiguous layer, said first operating system comprising a pair of stems, respectively a first stem sliding in a first direction perpendicular to the laying surface of the continuous layer, and a second stem sliding in a second direction parallel to the laying surface of the continuous foam layer, said first stem being active along the first direction to extract a moulding plate from the continuous foam layer and to transfer the exportioned plate in the position where the second stem is active, said second stem moving the exportioned plate towards a return station.

9. Plant according to claim 1, comprising means for moving in a moulding station each plate disconnected from the others, said means comprising a second operating system placed at a predetermined distance from the continuous layer, said second operating system comprising a pair of stems, respectively a third stem sliding in a first direction perpendicular to the laying surface of the continuous layer, and a fourth stem sliding in a second direction parallel to the laying surface of the foam, said third stem being slidable to bring a moulding plate on the foam layer from a supply station and vice versa, said fourth stem being slidable along the second direction for connecting and for releasing the plate.

10. Plant according to claim 8, comprising means for transferring the plates from the return up to the supply station.

11. Plant according to claim 10, wherein said means for transferring the plates comprise two conveyor belts placed at a predetermined distance side by side, each plate resting with the ends of its transverse portions devoid of moulding means on said conveyor belts.

12. Plant according to claim 1, wherein each plate comprises connecting means aimed to determine the grasping of the plate by the means for moving in a moulding station each plate disconnected from the other ones.

13. Plant according to claim 1, wherein each plate comprises releasing means ensuring the grasping of the plate by the means provided for removing the moulding plate from the continuous foam layer.

14. Plant according to claim 12, wherein said means for connecting and releasing in each plate are coincident.

15. Plant according to claim 14, wherein said means for connecting and for releasing comprise at least a seat substantially shaped as a cylinder with a cavity on the surface opposite to the one where the protuberances lay, said means for moving and removing the plate being inserted in said cavity.

16. Plant according to claim 1, wherein said laying surface of the latex foam comprises a plurality of carriers each having a base provided with a plurality of projecting moulding protuberances, all the carriers being reciprocally contiguous and in contact for the whole length of the plant between the first and the second station.

17. Plant according to claim 16, wherein said carriers are moved along a first stretch between the injecting station of the foam and the removing station of the foam layer and along a second stretch for the return of the carriers towards the injecting station, said carriers are placed reciprocally contiguous and in contact along the first stretch and distanced apart reciprocally along the second stretch, the speed of the carriers along the first stretch being greater of the speed of the carriers on the second stretch.

* * * * *